United States Patent [19]

Hjelmvik

[11] Patent Number: 6,026,367
[45] Date of Patent: Feb. 15, 2000

[54] METHOD OF BILLING THE PARKING OF VEHICLES BY MEANS OF PAY METERS

[75] Inventor: Torbernt Hjelmvik, Järfälla, Sweden

[73] Assignee: Modul-System Sweden AB, Järfälla, Sweden

[21] Appl. No.: 09/043,733

[22] PCT Filed: Sep. 23, 1996

[86] PCT No.: PCT/SE96/01182

§ 371 Date: Mar. 25, 1998

§ 102(e) Date: Mar. 25, 1998

[87] PCT Pub. No.: WO97/12343

PCT Pub. Date: Apr. 3, 1997

[30] Foreign Application Priority Data

Sep. 28, 1995 [SE] Sweden ................................ 9503357

[51] Int. Cl.$^7$ .............................. G06F 7/08; G06F 17/00; G06F 15/00
[52] U.S. Cl. ............................... 705/13; 705/13; 708/111; 235/378; 235/375; 235/381; 235/382; 235/384; 194/239; 194/209
[58] Field of Search .............................. 705/13; 235/382, 235/378, 381, 375, 384; 708/111

[56] References Cited

U.S. PATENT DOCUMENTS

| | | | |
|---|---|---|---|
| 4,022,014 | 5/1977 | Lowdenslager | 708/111 |
| 4,532,418 | 7/1985 | Meese et al. | 235/381 |
| 4,576,273 | 3/1986 | Milnes | 194/209 |
| 4,587,410 | 5/1986 | Milnes | 235/382 |
| 4,731,575 | 3/1988 | Sloan | 235/378 |
| 4,786,787 | 11/1988 | Nawada et al. | 235/381 |
| 4,788,419 | 11/1988 | Walters et al. | 235/381 |
| 4,861,971 | 8/1989 | Chan | 235/384 |
| 4,880,097 | 11/1989 | Speas | 194/239 |
| 5,166,680 | 11/1992 | Ganot | 235/384 |
| 5,278,395 | 1/1994 | Benezet | 235/384 |
| 5,351,187 | 9/1994 | Hassett | 705/13 |
| 5,490,077 | 2/1996 | Freytag | 235/375 |
| 5,510,992 | 4/1996 | Kara | 235/381 |
| 5,606,507 | 2/1997 | Kara | 235/381 |
| 5,648,906 | 7/1997 | Amirpanahi | 705/13 |
| 5,770,845 | 6/1998 | Hjelmvik | 235/382 |

FOREIGN PATENT DOCUMENTS

| | | |
|---|---|---|
| 0447312 | 9/1991 | European Pat. Off. . |
| 0582098 | 2/1994 | European Pat. Off. . |
| 459215 | 6/1989 | Sweden . |
| 501845 | 6/1995 | Sweden . |

*Primary Examiner*—James P. Trammell
*Assistant Examiner*—Nga B. Nguyen
*Attorney, Agent, or Firm*—Alfred J. Mangels

[57] ABSTRACT

A method of cash card billing with the aid of parking or pay meters when parking a vehicle. A pay meter system is provided which includes a plurality of pay meters, wherein each pay meter constitutes an independent operative unit and is equipped with a cash card reader. A person parking a vehicle finds a meter and with the aid of the cash card reader feeds into the pay meter information from the cash card relating at least to the cash card account number. When the cash card has been read by the first pay meter (BA1) the meter stores the account number (KN) and the parking commencement time (IT) in a memory (BA1 MEM) that is part of the first pay meter. The first pay meter (BA1) issues a parking ticket on which a transaction number (TN) and parking commencement time (IT) are recorded in a machine-readable form. When terminating the parking period, the parking ticket is read in a second pay meter (BA2), which may be any chosen pay meter in the pay meter system. The second pay meter (BA2) stores the transaction number (TN) and parking commencement time (IT) read by the meter from the parking ticket, together with the parking termination time (UT), in a memory (BA2 MEM) that is part of the second meter. The contents of memories BA1 MEM and BA2 MEM are transferred to the memory of a central computer that calculates the parking fee and bills the cash card account number.

10 Claims, 1 Drawing Sheet

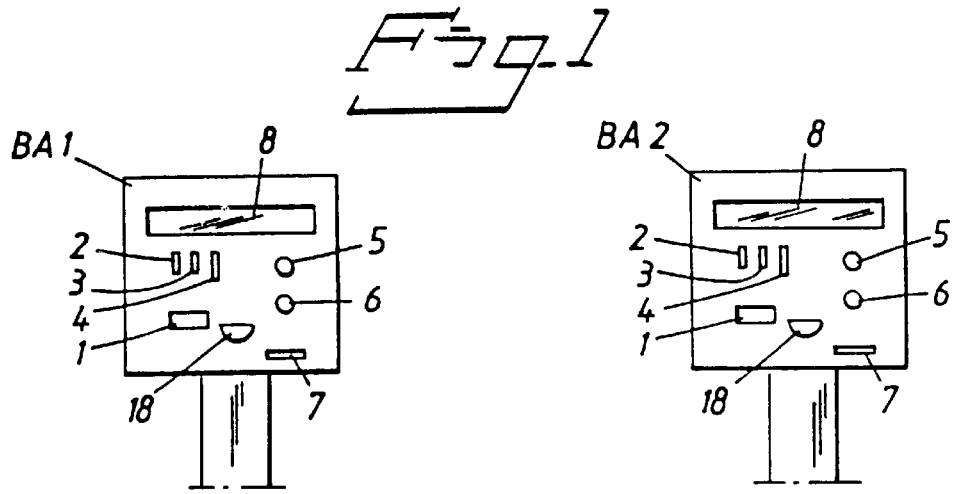
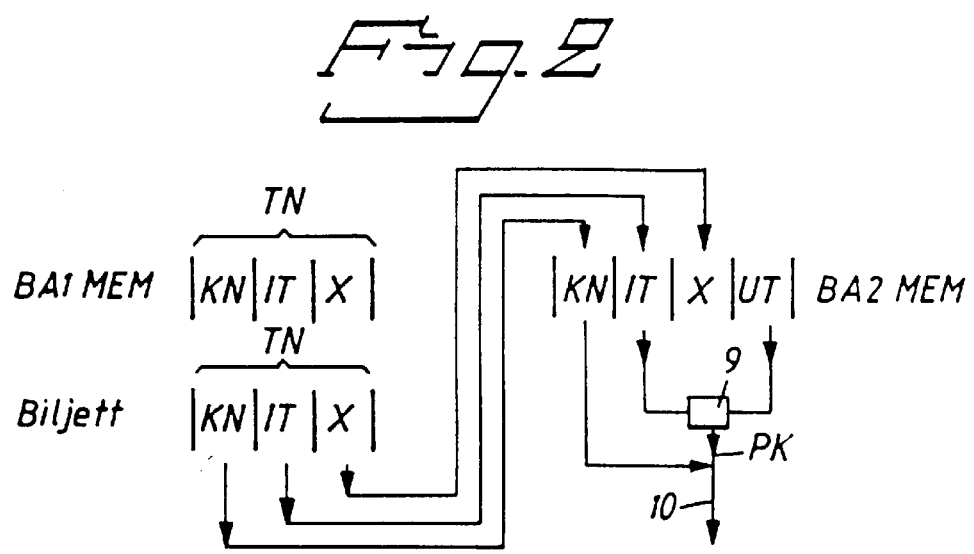
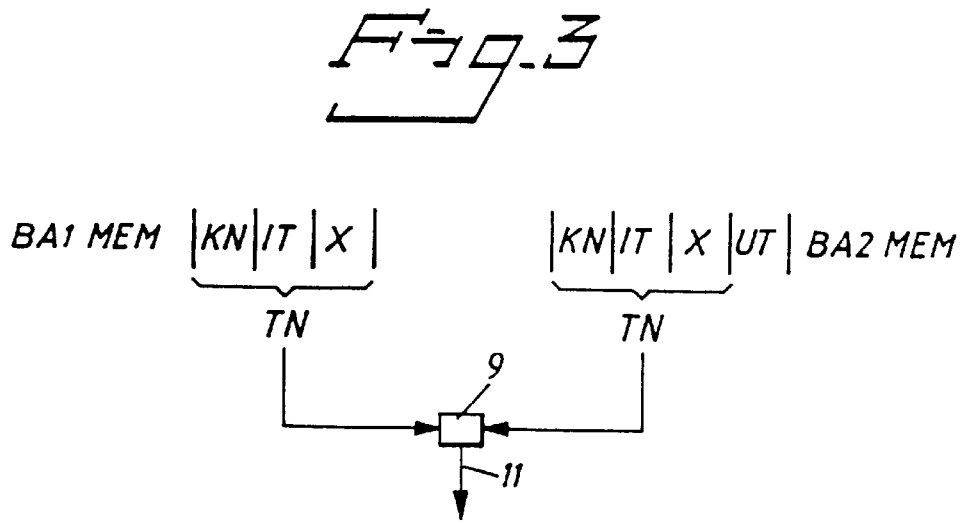

METHOD OF BILLING THE PARKING OF VEHICLES BY MEANS OF PAY METERS

BACKGROUND OF THE INVENTION

1. Field of the Invention

The present invention relates to a method of billing the parking of vehicles by means of parking meters or pay meters. More specifically, but not exclusively, the invention relates to a method for billing a parking fee to a cash card, pay card or credit card account.

2. Description of the Related Art

In cities, towns and other municipalities, there will be one or more vehicle parking companies who have so-called pay meters distributed throughout the city or town in a number of different places, where streets, roads and large parking areas are the most common places.

In recent times, it has become possible to pay parking fees with different types of banker's card or cash card, in addition to coin payment. When a cash card is used, the person parking a vehicle will draw the card through a card reader on the parking meter.

The invention relates to the type of payment system in which the person parking a vehicle draws a cash card through a card reader in the pay meter, whereupon the meter stores the card number and the time at which the card was read, and then issues a parking ticket. This ticket is usually placed on the dashboard, in a position where it can be seen.

According to one known system, when collecting the vehicle the person concerned again goes to the pay meter and again draws the card through the card reader. The pay meter then again stores the card number and compares the vehicle collection time with the earlier time at which the card was first drawn through the card reader installed in the pay meter. The pay meter then calculates the parking fee to be billed and stores this sum together with the number recorded for the card to be charged, and issues a receipt.

One problem with this system is that when collecting the vehicle, it is necessary to go to the same pay meter as that in which the card was first read on the parking occasion, in order for the card to be read again on the vehicle collecting occasion. More specifically, the problem resides in the fact that certain parking areas include a large number of pay meters and occasionally drivers forget which pay meter they have used when parking the vehicle. Another problem is that people who park a vehicle several times in a number of different parking places and within a limited time period are forced to find the relevant pay meter twice on each separate parking occasion.

One solution to these problems would be to connect all pay meters permanently to a central computer in an on-line system, in which the storage of all information and the calculation of all parking fees, the billing of the accounts of respective cash cards, etc., is dealt with centrally. This solution cannot be put into practice, however, because of the excessively high cost entailed by connecting all pay meters to a central computer.

It is therefore highly desirable to be able to use any pay meter whatsoever when parking a vehicle and then use any pay meter whatsoever when collecting the vehicle. The only requirement would be that the two meters used belong to one and the same parking company. In this regard, it would be possible to commence a series of parking occasions at one place in the city or town and draw the cash card through the reader of a given meter and to terminate the series of parking occasions at another place in the city or town, by drawing the card through the reader of another meter.

Swedish Patent 501 845 teaches a solution to this problem in which each meter is free-standing and thus not connected to other meters or to a central computer.

This prior publication relates to a method of cash card billing with the aid of pay meters when parking a vehicle, there being provided a pay meter system which includes a plurality of meters, each constituting an independent operative unit. Each of the meters is equipped with a cash card reader. A person wishing to park a vehicle finds a meter and with the aid of the cash card reader feeds-in from the cash card information relating at least to the cash card account number. The meter issues a parking ticket on which the time at which the parking period was commenced, subsequent to having read the cash card.

The known invention is characterized in that when the cash card is read by a first meter BA1 in conjunction with the commencement of the parking period, the meter is caused to store the account number KN and the time, i.e., the parking commencement time IT, together with a transaction number TN, as a first transaction T1, in a memory BA1 MEM which belongs to the first meter, this transaction number being unique. The meter BA1 is caused to issue a parking ticket on which the transaction number TN is given in a form that can be read by a meter.

When terminating the parking period, the parking ticket is caused to be read in a second meter BA2, which may be any chosen meter in the meter system, including the said first meter, wherein the second meter BA2 is caused to store in a memory BA2 MEM belonging to said second meter the transaction number TN read by the meter from the parking ticket together with the time at which the ticket was read, the parking termination time UT, as a second transaction T2.

The memories of the respective first meter and the respective second meter are emptied at given times and transferred to the memory of a central computer.

The central computer is caused to combine the respective transactions T1 and T2 of the first and the second meters BA1 and BA2 with the aid of the transaction numbers TN and therewith bill the cash card account number KN with a parking fee calculated on the parking commencement time IT and the parking termination time UT.

One problem with the system disclosed in this prior patent specification is that it is necessary to empty a large number of memories of their respective contents in a large number of pay meters and run the information taken from the memories through a central computer before the cash card or credit card used can be billed.

A system which enables parking of vehicles to be commenced and terminated throughout a wide geographical area is likely to include a very large number of pay meters whose memory contents must be accessible in the central computer at one and the same time.

Another problem is that if the memory content of a pay meter is not available at the time of running said information through the central computer, it will not be possible to pair up the transactions stored in the memory of this particular meter with associated transactions in the memories of other meters with the aid of the transaction numbers, therewith preventing billing of the cash card or credit card concerned.

The present invention solves these problems.

SUMMARY OF THE INVENTION

The present invention thus relates to a method of cash card billing parking facilities with the aid of pay meters, there being provided a pay meter system which includes a plurality of meters of which each meter constitutes an independent operative unit, wherein the meters are equipped with a cash card reader. A person parking a vehicle finds a meter and with the aid of the cash card reader feeds-in information from the cash card relating at least to the cash card account number. When the cash card is read by a first meter (BA1) the meter is caused to store the account number (KN) and the parking commencement time (IT) in a memory (BA1 MEM) belonging to the first meter, whereafter the meter (BA1) is caused to issue a parking ticket on which a transaction number (TN) is recorded in a form that can be read by a machine. At the end of the parking period, the parking ticket is caused to be read in a second pay meter (BA2), which may be any chosen meter in the meter system, including the first meter. The second meter (BA2) is caused to store the transaction number (TN) read by the meter from the parking ticket together with the time at which the ticket was read, the parking termination time (UT), in a memory (BA2 MEM) belonging to said second meter as a second transaction (T2). The the first pay meter records on an issued parking ticket at least the card account number (KN) and the parking commencement time (IT) in a machine readable form, where the account number and the parking commencement time constitute or are included in the transaction number (TN). The memory (BA1 MEM, BA2 MEM) of each pay meter is emptied and the contents of each pay meter memory is transferred to the memory of a central computer which bases billing of respective cash cards on the information in the memory (BA2 MEM) of the pay meter that was last used.

BRIEF DESCRIPTION OF THE DRAWINGS

The invention will now be described in more detail with reference to an exemplifying embodiment thereof and also with reference to the accompanying drawing, in which FIG. 1 is a schematic illustration of two pay meters BA1 and BA2;

FIG. 2 is a flow sheet illustrating a first part of the invention; and

FIG. 3 is a flow sheet illustrating a second part of the invention.

DESCRIPTION OF THE PREFERRED EMBODIMENTS

FIG. 1 illustrates two pay meters BA1 and BA2 which are independent operative units and which are assumed to be distanced from one another, for instance located at mutually different parking places.

The invention relates to a method in which there is used a plurality of meters which belong to the same parking billing system and each of which is an independent operative unit. By system is meant, for instance, that the various meters are mutually identical and are operated on the behalf of one and the same vehicle parking company.

The pay meters are equipped with a cash card reader 1. As used herein, the term "cash card" includes cash cards, pay cards, and credit cards. The meters may also be equipped with a coin insertion means 2–4 in which coin payments can be made, and with a pay button 5 and a cancel button 6, both intended for coin payments. The meters also include a coin cup 18. The meters are also provided with a dispensing slot 7 through which a parking ticket is dispensed at the beginning of a parking period. This slot is also preferably used for the insertion of a parking ticket when the parking period is terminated. The meter is constructed to read from the parking ticket information recorded thereon in a meter-readable form when the ticket was issued in conjunction with the commencement of a parking period. The meters may also include a conventional display 8, for displaying time, the time at which a stipulated parking period expires in the case of coin payments, that the cash card has been read, that the cash card is invalid, etc.

The present invention, however, relates to cash card payments.

A person wishing to park a vehicle finds a first pay meter at the beginning of the parking period and inserts a cash card whereupon the card reader reads from the card information relating to at least the cash card account number. When the cash card is read by the first pay meter (BA1), the pay meter stores the account number (KN) and the parking commencement time (IT) in a memory (BA1 MEM) belonging to the pay meter, whereafter the pay meter (BA1) is caused to issue a parking ticket on which a transaction number (TN) is recorded in a machine-readable form.

The parking ticket is then placed inwardly of the windscreen where the ticket can be seen by a parking attendant, enabling the attendant to establish that the ticket has been taken from the pay meter.

At the end of the parking period, the parking ticket is inserted into and read by a second pay meter (BA2), which may be any pay meter in the pay meter system, including the first pay meter. The second pay meter (BA2) is caused to store in a memory (BA2 MEM) belonging to the second pay meter the transaction number (TN) read from the parking ticket, the account number (KN), and the parking commencement time (IT), together with the time at which the ticket was read, the parking termination time (UT). This is illustrated in FIG. 2, in which the various information bits KN, IT, UT and TN are shown.

The above description is found in all essential details in the aforesaid Swedish patent specification.

According to the present invention, the first pay meter is caused to record on the issued parking ticket at least the account number (KN) and the parking commencement time (IT) in a machine-readable form, where the account number and parking commencement time either constitute or are included in the transaction number (TN).

This is illustrated in FIG. 2, from which it can be seen that when reading the cash card, the account number KN and the parking commencement time IT are stored in the memory BA1 MEM of the first pay meter. According to the invention, the transaction number TN may be comprised of both KN and IT, although an additional number or characters X can be included. For instance, the number X may be the number of the pay meter.

The pay meter BA1 dispenses a parking ticket which records the transaction number TN and which includes the data bits KN and IT and also optionally the number X in a machine-readable form.

At the end of the parking period, the parking ticket is read in a second pay meter, wherein the data bits KN and IT, and also the additional number X when included, are stored in the memory BA2 MEM of the second pay meter, as shown to the right of FIG. 2. The parking termination time UT is also stored in said memory when the parking ticket is read.

The memories BA1 MEM and BA2 MEM of respective pay meters are emptied and their contents transferred to the memory of a central computer 9.

Respective cash cards are billed on the basis of the information contained in the memory BA2 MEM of the pay meter last used. This involves a first stage in which billing is carried out solely on the basis of the memory of the pay meter last used, and consequently transactions stored in the memory of the first pay meter are not paired with transactions stored in the second pay meter.

This is also illustrated in FIG. 2, according to which the central computer 9 is caused to compare the parking commencement time IT and the parking termination time UT, and therewith calculate the parking fee PK. The computer then bills the account number KN of the relevant cash card. The arrow 10 illustrates a billing transaction.

According to one preferred embodiment, the first pay meter is caused to record on the parking ticket at least the account number of the cash card used in an encrypted or encoded form. To this end, there is used in accordance with the invention an encrypting program or corresponding software in a microprocessor in the first pay meter. This increases security against unlawful spreading of invalid cash card numbers. The account number is decrypted or decoded suitably in the central computer.

According to a preferred embodiment of the invention, the second pay meter BA2 is caused to calculate the parking fee on the basis of the parking commencement time IN and the parking termination time UT and store the calculated fee together with the account number. As described in the aforegoing, the parking commencement time IT and the parking termination time UT are compared in a processor in the second pay meter BA2, whereafter the parking fee is stored in the memory BA2 MEM of said pay meter, together with the account number.

In a second stage, the memory content of the first pay meter and the memory content of the second pay meter are processed in the central computer, wherewith the central computer is caused to combine the transactions recorded by the first pay meter BA1 with the transactions recorded by the second pay meter BA2 with the aid of the transaction numbers TN, and therewith sort out those transactions recorded in the first pay meter BA1 that lack corresponding transactions in the second pay meter BA2. The account number KN received from the memory of the first pay meter will then be billed a predetermined parking fee.

This is illustrated in FIG. 3. The memory content of the first pay meter memory BA1 MEM gives the transaction number TN which is compared with transaction number TN in the memory content of the second pay meter BA2 MEM. This comparison is made in the central computer 9. When the transaction number TN is not found in BA2 MEM, the computer 9 issues a bill 11 based on the account number KN recorded in the memory BA1 MM of the first pay meter. On the other hand, the central computer undertakes no such predetermined parking fee billing procedure when all transaction numbers in the memory of the first pay meter are found in the memory content BA2 MEM of the second pay meter.

The fact that a transaction has been entered in a first pay meter but no corresponding transaction has been entered in a second pay meter may mean that the person concerned has forgotten to terminate the parking period or has simply not bothered to do so. The predetermined parking fee may, for instance, be the fee that corresponds to a maximum permitted parking time.

The invention thus provides the significant advantage of enabling billing to be made more quickly, by enabling the transactions entered into the central computer concerning parking termination time or total predetermined parking fee to be billed to the cash card concerned immediately upon transfer to the central computer of the memory content of a pay meter.

It is only in this second stage that transaction numbers are paired together. Since the great majority of people parking a vehicle also terminate parking in the manner intended, only a small part of the total revenues will be billed at a later time.

According to one preferred embodiment of the invention, the machine-readable part of the parking ticket will include either a magnetic code, a punched code or a bar code or some other form of known machine-readable code.

In order for the system to be safe, each transaction number must be unique. Otherwise, one and the same transaction number could occur on two or more different parking occasions, resulting in wrong billing.

According to one preferred embodiment of the invention, the transaction number TN is comprised of both the account number KN and the parking commencement time, where the parking commencement time IT is recorded with an accuracy of less than about 0.15 minutes, preferably 0.1 minute. This recorded transaction number will therefore be unique, since it takes longer than 0.15 minute to complete commencement of the parking of a vehicle, i.e., from the time that the cash card is read to the time of issuing the parking ticket in the first pay meter.

The memories of the first pay meter and the second pay meter are emptied at given time intervals. This can be carried out by personnel who transfer the information to a portable memory or who replace the memory of a respective meter with another memory. Alternatively, the information in the memories of respective meters can be collected off-line via a cable, modem or radio, and therewith transferred to a central computer. The information collected by personnel is also transferred to the memory of a central computer.

It will be evident from the aforegoing that the invention enables a person to use one pay meter in the system when parking is commenced and another pay meter when parking is terminated.

According to a preferred embodiment of the invention, the first pay meter prints the parking commencement time (IT) clearly on the parking ticket. This enables the ticket to be checked without needing to refer to a so-called vehicle-in list.

Naturally, the parking commencement time can also be recorded on the ticket in an encrypted or coded form. The transaction number can also include further data, such as the number of the pay meter concerned, etc., in addition to the parking commencement number and the account number.

It will therefore be understood that the invention is not restricted to the aforedescribed and exemplified embodiments thereof, and that modifications can be made within the scope of the following claims.

What is claimed is:

1. A method of cash card billing with the aid of parking or pay meters when parking a vehicle, including a meter system which includes a plurality of pay meters each constituting an independent operative unit, wherein the meters are equipped with a cash card reader and wherein a person parking a vehicle finds a meter and with the aid of the cash card reader feeds-in to the pay meter information from the cash card including at least the cash card account number, said method comprising the steps of:

a. reading the cash card account number in a first pay meter and storing the cash card account number and a parking commencement time in a memory in the first pay meter, b. issuing a parking ticket on which a transaction number, the cash card account number, and the parking commencement time are recorded in a machine-readable form, c. when terminating a parking period, reading the machine-readable information on the parking ticket in a second pay meter which can be any chosen pay meter in the pay meter system including the first pay meter, d. storing in a memory in the second pay meter the transaction number read by the second pay meter from the parking ticket together with the parking termination time, wherein the transaction number includes the cash card account number and the parking commencement time;

e. transferring the memory contents of each pay meter to a memory of a central computer; and f. billing respective cash cards on the basis of the cash card account number, the parking commencement time, and the parking termination time stored in the memory of the pay meter last used by a person terminating a parking period.

2. A method according to claim 1, including the step of causing the first pay meter to record on the parking ticket at least the cash card account number in an encoded form.

3. A method according to claim 1 including the step of calculating a parking fee in the second pay meter on the basis of the parking commencement time and the parking termination time, and storing the calculated parking fee with the account number.

4. A method according to claim 1, including the step of processing the contents of the memory of the first pay meter and the contents of the memory of the second pay meter in the central computer, wherein the central computer combines the transactions of the first pay meter with the transactions of the second pay meter with the aid of the transaction numbers, and identifying and sorting those transactions in the first pay meter that lack a corresponding transaction in the second pay meter, and billing the cash card number of the sorted transactions a predetermined parking fee.

5. A method according to claim 1, wherein the transaction number includes the cash card account number and the parking commencement time, and wherein the parking commencement time is recorded in increments below about 0.15 minutes.

6. A method according to claim 1, including the step of printing the parking commencement time visibly on the parking ticket.

7. A method according to claim 1, including the step of providing in the machine-readable part of the parking ticket a code selected from the group consisting of magnetic code, punch code, and bar code.

8. A method according to claim 1 wherein the cash card account number and the parking commencement time either constitute the transaction number.

9. A method according to claim 1, wherein the cash card account number is recorded on the parking ticket in encrypted form.

10. A method in accordance with claim 5 wherein the parking commencement time is recorded in increments of 0.1 second.

* * * * *